United States Patent Office 3,545,856
Patented Dec. 8, 1970

3,545,856
APPARATUS FOR MAKING COPIES
Walter Limberger, Hamburg, Poppenbuttel, Germany, assignor to Lumoprint Zindler KG, Hamburg, Germany
Filed Apr. 12, 1968, Ser. No. 720,876
Claims priority, application Germany, Apr. 12, 1968,
L 56,311
Int. Cl. G03b 27/50, 27/70
U.S. Cl. 355—51                                    2 Claims

ABSTRACT OF THE DISCLOSURE

An apparatus for making copies comprises a housing, exposure means arranged within the interior of the housing including an exposure opening provided in the housing's upper cover wall, and an exposure passage communicating with a guide path for the sheets of copying material stored in a stack holder arranged within the interior of the housing. The location for applying an original copy is arranged on the upper cover wall of the housing adjacent the elongated exposure opening which extends transversely to the guide path and in parallelly spaced relation to one edge of the cover wall. The stack holder for the sheets of copying material, which having their layer sides facing downwardly, is disposed adjacent the exposure opening below the applying location for the original copies and below the upper cover wall of the housing. The guide path for the sheets of copying material includes substantially horizontal sections extending in parallelly spaced relation to each other and to the upper cover wall below the latter and connected by a substantially vertically extending section of the guide path.

DISCUSSION OF THE KNOWN ART

Figure 1:
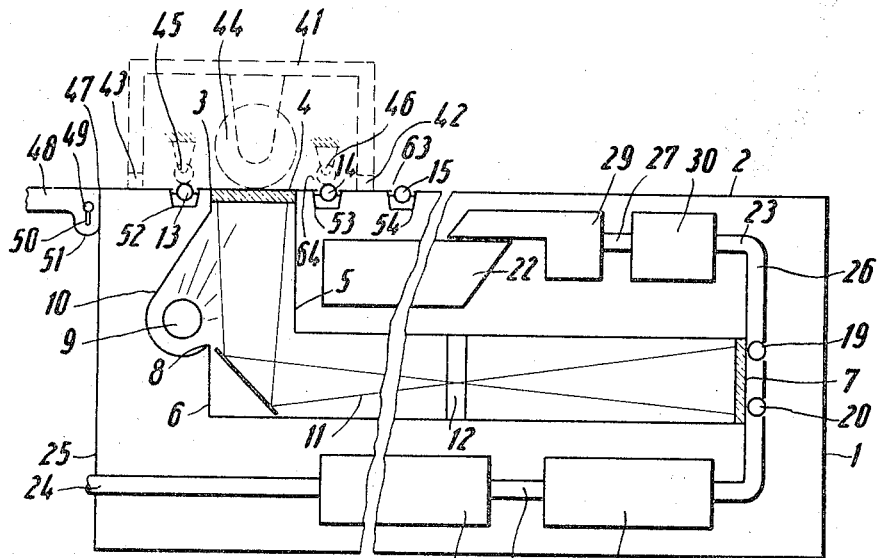

In a known apparatus, adapted for making episcopic exposures, the exposure opening covered by a glass plate is arranged substantially in the middle of the cover wall, and is generally dimensioned at least corresponding to the original copy.

According to another embodiment of an apparatus in which sheet-like original copies are fed through a side wall of the housing to a rotating exposure drum, it is known to arrange the stack holder below the upper cover wall, and to insert sheets of copying material with the layer side facing downwardly. The pulled-out sheets are then guided into a guide path including a vertical section with a translucent guide surface provided therein forming a part of the exposure device, upon which the exposure rays are directed.

The first one of the known embodiments requires a rather large apparatus not well adapted to be used as a table apparatus, and not allowing exposures to be made in a continuous passage method. The latter feature is of advantage if pages of books are to be copied. However, the exposure of the entire original copy requires a substantial capacity of the sources of exposure light, even if they are guided to pass below the original copy.

The known embodiment mentioned secondly does not allow making copies of originals other than in the form of sheets, for example pages of books, because they cannot be passed around a rotating drum. The arrangement of the stack holder and the sheets of copying material in the stack depends on spatial accommodation possibilities.

It has been proposed already to arrange, in an apparatus, an elongated exposure opening extending in parallel relation adjacent to an edge of the upper cover wall. Guide means, associated with this elongated, i.e., slot-like exposure opening extending transversely to the direction of passage, allow guiding of both sheet-like original copies and also book-like original copies past the exposure opening. In this proposed apparatus, the stack holder is arranged above the bottom of the apparatus and the copying material is supplied from below, and is guided in a substantially vertical section of a guide path for the copying material. However, this is a disadvantage in that, due to the single reorientation of the L-shaped channel for the exposure device, the original copies must be guided from outside of the apparatus on the upper side of the cover wall to the middle of the apparatus. This is considered to be a disadvantage since it is also possible, if desired, to extend the upper cover wall by a laterally disposed table, or by a detachable plate. However, in this case the supply of the original copy involves a problem, since the guide means must extend to this table, or plate, respectively, whereby steps are likely to be formed in the guide path at the transition from the upper cover wall to the table, or extension plate respectively, due, for example, to the detachability of the plate.

The already proposed embodiment indeed discloses a novel principle which, particularly with a detachable structure above the exposure opening, allows making copies of sheet-like original copies, and also, after swinging down the structure, of books. However, the handling is problematical for the mentioned reasons. As guide means, rollers are proposed, projecting somewhat upwardly beyond the upper side of the cover wall.

OBJECTS OF THE INVENTION

The principal object of the invention is to improve an apparatus comprising an exposure device of such a type having a slot-like exposure opening arranged in the upper cover wall of the housing adjacent one edge thereof, wherein the original copies may be guided from a defined support on the housing outwardly across the exposure device.

Another object of the invention is to provide an apparatus in which the major part of the upper cover wall of the apparatus may be used for depositing or applying the original sheet, so as to place and align the same in a defined manner prior to the exposure procedure.

Another object of the invention is to provide an apparatus in which the original sheet is guided and supported when being moved across to the exposure opening.

Another object of the invention is to provide an apparatus in which the guide means are formed by flat ribs extending in the advancing direction of the original copy and tapering to zero height at their ends, particularly at those ends facing the exposure opening.

Another object of the invention is to provide an apparatus wherein the guide means include rollers having a circumferential portion projecting into the path of movement of the original copy.

Still another object of the invention is to provide an apparatus having an L-shaped exposure channel extending between the exposure opening and the guide path for the sheets of copying material.

These and other objects and features of the invention will become readily apparent to those skilled in the art from the following description of one embodiment of the invention in connection with the attached drawings given by way of example only, and not in a restrictive sense.

DESCRIPTION

Figure 2:
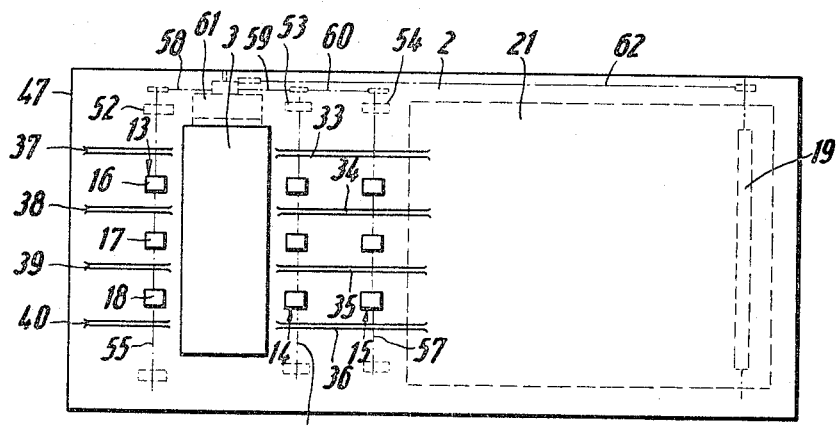

In the drawings:
FIG. 1 is a diagrammatic sectional side elevational view, in which additional parts are shown in dashed lines, and
FIG. 2 is a top view of the apparatus shown in FIG. 1, including an additional feature.
The housing 1 of the apparatus has an upper cover wall 2. The housing has, as may be seen in the top view of FIG. 2, an elongated rectangular shape. A slot-like exposure opening 3 is provided in parallelly spaced relation adjacent to one of the minor edges 47, and has a translucent plate 4, for example of glass, arranged therein. A channel, of substantially L-shaped configuration, screened at its edges by partition wall elements 5, 6, extends within the housing to a translucent guide surface 7, past which the copying material is guided. A wall defining the channel is apertured at 8 so as to allow the entrance of light, for example from a rod-like source of exposure light arranged within a reflector 10. Within the horizontal section of the channel 11 an objective 12 is arranged. Laterally the channel is defined by partition walls extending in parallel relation to the plane of the drawing.

In the front and in the rear of the opening 3, or the plate 4 respectively, at least one or a plurality of rollers, or roller portions 13, 14, 15 respectively, are rotatably supported, projecting with peripheral portions through apertures 63, 64 provided in the upper cover wall. Each of the rollers 13 to 15 consists, for example, of three portions which, referring to roll 13 in FIG. 2, are denominated with 16, 17, 18. Two of these rows 14, 15 are arranged at the right hand side of the opening 3, when viewing FIG. 2.

Bearing brackets 52 to 54 are arranged laterally below the cover wall 2. In FIG. 2 the shafts 55, 56, 57 are shown having drive connections via transmission gearings 58, 59, 60 with the drive motor 61. These rollers 13 to 15 are, when viewing FIG. 1, driven in a counterclockwise direction, whereby an original copy placed thereon and urged thereagainst is moved with a defined speed. This speed is synchronized with corresponding rollers of a row of rollers 19, 20 provided at the guide surface 7 and serving to pass a sheet of copying material. The transmission gearing 62, for example for the roller 19, is shown in FIG. 2.

On the cover wall 2, at the right hand side of the exposure opening 3, or also at the right hand side of the roller arrangement 15, there is a considerable free space. This space, defined in FIG. 2 by a dashed line 21, serves as an applying location for an original copy. This applying location may also be extended to directly in front of the exposure opening 3, since the rollers 14, 15 cannot take along a deposited original copy, before it is urged thereagainst. Preferably the applying location extends to substantially between the rollers 14 and 15, if additional means are provided, as shown in FIG. 1.

The applying location on which the original copy is placed prior to making a copy is of substantial importance, because it allows aligning of the original copy, in preparation to an exposure procedure, if the occasion arises, on a fitting edge, or also with respect to aligning lines provided at the upper side of the cover wall, respectively.

Below the applying location and adjacent to the exposure opening 3, or the fitting edge 4, respectively, there is arranged a stack holder 22 accommodating the sheets of copying material with the layer sides facing downwardly. A U-shaped guide path, denoted totally with 23, and shown in FIG. 1, extends from the stack holder to a discharge opening 24 provided in the face wall 25 of the housing. In the vertical section 26 of the guide path 23 defined by guide elements the guide surface 7 is arranged. Driven transporting means and other processing means are arranged in the substantially horizontally extending legs 27 and 28 of the guide path 23. For example, an extraction device 29 is associated with the stack holder 22. By means of guide elements the copying material is removed by the extraction device 29 out of the stack holder 22 and moved through a sensitizing, or loading, station 30 into the substantially vertical section 26 of the guide path. A developing device, and a drying device, or annealing device respectively, are arranged within the guide path section 28 at 31, or 32, respectively.

The particular construction of the processing means 29, 30, 31, and 32, and the particular arrangement of transport means are not subject matter of this invention, and may be chosen in any way to suit the purpose. Drive motors, transmission gears, and other transmission means for the processing means are according to common practice.

It will be noticed that the concept of the invention relates to a novel apparatus providing an advantageous applying location on the upper side of the housing for preparing the original copies for the exposure, and permitting easy guiding of sheet-like and book-like original copies past the exposure opening 3. According to FIG. 2, for example, ribs 33, 34, 35, 36, 37, 38, 39, 40, with a cross sectional shape of circular segments and having a height somewhat less than the upwardly projecting sections 16, 17, 18 of the rollers 13, 14, 15, which may be arranged between the ribs, may be provided extending in parallel relation to the direction of advancing the original copy, so as to serve as straight guide means. These ribs taper to zero height in the upper surface of the apparatus at their ends, especially those ends facing the exposure opening 3.

For making copies of sheet-like original copies an already proposed detachable, or if occasion arises, a downwardly tiltable cover-like structure 41, may be arranged above the upper cover wall, including an inlet slot 42 and an outlet slot 43, and within the interior a pressing and transporting roller 44 for moving the sheet-like original copy past the plate 4 and towards the sections of the rows of rollers 13 and 14 cooperating with correspondingly shaped rows of counter rollers 45 and 46. The arrangement is such that the roller 44 and the rows of rollers 45 and 46 are resiliently urged in contacting engagement. In addition drive elements and a driving clutch for the roller 44 are provided within the interior of the apparatus whereby it is driven synchronously to the advancing speed of the sheet of copying material.

The invention includes that an extension table 48, which preferably is tiltable downwardly, is arranged at the edge 47 of the cover plate 2. For example, a transversely extending rod 49 is arranged in spaced relation at the face wall 25 of the housing 1 below the upper surface of the cover wall 2, this rod extending through elongated holes 50 provided in downwardly directed projections 51 of the plate 48. In the illustrated position the plate 48 is supported with the upper ends of the elongated holes 50 on the rod 49, wherein an alignment to the upper side of the cover wall 2 is obtained by the surface of the projections 51 abutting on the face wall 25. The plate 48 may be lifted and when the lower ends of the elongated holes abut the rod 49, it may be pivoted in a counterclockwise direction.

What is claimed is:
1. In copying apparatus of the type including a housing having an upper cover wall formed with an exposure opening which is part of an exposure arrangement including an exposure channel and means forming a transparent guide surface, the copying apparatus further including a guidance track for the copy material extending from a stack holder for the copy material, within the housing, with the transparent guide surface being at an intermediate portion of the guidance track and processing devices, for finishing the copies, being arranged along the guidance track, the exposure opening being elongated and arranged parallel to and substantially at an edge of the upper cover wall and a surface for positioning an original being provided on the upper cover wall adjacent the exposure opening: the improvement comprising, in combination, said stack holder being positioned next to said exposure opening, beneath said upper cover wall, and directly below said surface for positioning an original, said stack holder receiving the sheets of copy material with the active layer thereof facing downwardly; said guidance track having a first section extending substantially parallel with said upper cover wall and beneath the same, from said stack holder, and said guidance track having a second section extending substantially vertically and connected to said first section and following the latter; and guidance means on the upper surface of said upper cover wall at the surface for positioning an original, and operable to guide an original past said exposure opening.

2. In copying apparatus, the improvement claimed in claim 1, in which said guidance means comprising relatively low ribs extending along the upper surface of said upper cover wall in the direction of feed of the original past said exposure opening; and guide rollers rotatably supported beneath said upper cover wall; said upper cover wall being formed with apertures adjacent each of said guide rollers and each guide roller having a portion of its periphery extending upwardly through a respective aperture to project above the upper surface of said upper cover wall; said ribs tapering at their ends and toward said exposure opening to merge into the upper surface of said upper cover wall; the height of said ribs being less than the projection of said guide rollers upwardly beyond the upper surface of said upper cover wall.

References Cited

UNITED STATES PATENTS

| | | | |
|---|---|---|---|
| 3,255,663 | 6/1966 | Limberger | 355—27 |
| 3,343,450 | 9/1967 | Glaser et al. | 355—51 |
| 3,358,555 | 12/1967 | Call | 355—51 |
| 3,432,234 | 3/1969 | Johnson | 355—27 |
| 3,457,011 | 7/1969 | Hanson | 355—51 |

JOHN M. HORAN, Primary Examiner

D. J. CLEMENT, Assistant Examiner

U.S. Cl. X.R.

355—66, 27